US 11,394,341 B2

(12) United States Patent
Chun (10) Patent No.: US 11,394,341 B2
(45) Date of Patent: Jul. 19, 2022

(54) OVER-TEMPERATURE PROTECTION SYSTEM AND METHOD FOR DC CAPACITOR OF INVERTER

(71) Applicants: Hyundai Motor Company, Seoul (KR); Kia Motors Corporation, Seoul (KR)

(72) Inventor: Ho Tae Chun, Chungcheongnam-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/922,440

(22) Filed: Jul. 7, 2020

(65) Prior Publication Data

US 2021/0184622 A1  Jun. 17, 2021

(30) Foreign Application Priority Data

Dec. 16, 2019 (KR) .......................... 10-2019-0168213

(51) Int. Cl.
*H02P 29/68* (2016.01)
*H02P 27/08* (2006.01)

(52) U.S. Cl.
CPC ............. *H02P 29/68* (2016.02); *H02P 27/08* (2013.01)

(58) Field of Classification Search
CPC .......... H02M 1/327; H02P 8/36; H02P 29/68; H02H 3/08; H02H 5/04; H02H 7/1255
See application file for complete search history.

(56) References Cited

U.S. PATENT DOCUMENTS

| 5,587,641 | A | * | 12/1996 | Rozman | ................... | F02N 11/04 |
| | | | | | | 318/400.12 |
| 2002/0085397 | A1 | * | 7/2002 | Suzui | ..................... | H02J 3/381 |
| | | | | | | 363/37 |
| 2015/0130380 | A1 | * | 5/2015 | Kato | ..................... | H02P 27/085 |
| | | | | | | 318/400.21 |
| 2015/0295490 | A1 | * | 10/2015 | Yamagami | .............. | H02M 1/36 |
| | | | | | | 363/49 |
| 2016/0079896 | A1 | * | 3/2016 | Maeda | ..................... | H02P 8/14 |
| | | | | | | 318/685 |
| 2016/0197567 | A1 | * | 7/2016 | Nishiyama | ............... | H02P 6/18 |
| | | | | | | 318/400.17 |
| 2018/0254734 | A1 | * | 9/2018 | Kano | ...................... | H02P 29/68 |
| 2020/0220480 | A1 | * | 7/2020 | Arao | .................... | H02H 7/1216 |

FOREIGN PATENT DOCUMENTS

| KR | 2013-0110553 A | 10/2013 |
| KR | 2018-0088160 A | 8/2018 |

* cited by examiner

*Primary Examiner* — Bickey Dhakal
(74) *Attorney, Agent, or Firm* — Fox Rothschild LLP (57) ABSTRACT

An over-temperature protection system and method for a DC capacitor of an inverter are provided. In the over-temperature protection system, a capacitor generates a DC voltage on both terminals thereof. An inverter converts the DC voltage generated on the both terminals of the capacitor into an AC voltage and supplies the AC voltage to a motor. A controller induces a ripple current of the capacitor based on a driving point determined by a torque and a speed of rotation of the motor and determines whether the capacitor is in an over-temperature state based on a totalized value of the ripple current.

13 Claims, 12 Drawing Sheets

OVER-TEMPERATURE PROTECTION SYSTEM AND METHOD FOR DC CAPACITOR OF INVERTER

CROSS REFERENCE TO RELATED APPLICATION

The present application claims priority to Korean Patent Application No. 10-2019-0168213, filed Dec. 16, 2019, the entire contents of which is incorporated herein for all purposes by this reference.

BACKGROUND

Field of the Invention

The present disclosure relates generally to an over-temperature protection system and method for a direct current (DC) capacitor of an inverter and, more particularly, to an over-temperature protection system and method for a DC capacitor of an inverter, in which the temperature of a direct current (DC) capacitor is prevented from excessively increased by a ripple even when the current or temperature of the DC capacitor is not directly detected by a sensor.

Description of the Related Art

In general, a vehicle using a motor to generate driving force of vehicle, such as an electric vehicle or a plugged-in hybrid vehicle, is provided with an inverter to convert direct current (DC) power of a battery into multiphase (e.g., three phase) alternating current (AC) power to drive the motor. In addition, a capacitor configured to generate a DC voltage is connected to a DC terminal of the inverter, and a current sensor configured to detect a three-phase current to be supplied to the motor is provided on an output terminal of the inverter.

In addition, an inverter includes a plurality of switching elements, and switches the plurality of switching elements to a higher frequency using pulse width modulation (e.g. space vector pulse width modulation), thereby converting DC power into AC power. Due to the switching, a ripple, i.e. an AC component, inevitably occurs on input and output terminals of the inverter. Since the capacitor connected to the DC terminal of the inverter provides a lower impedance path to an AC component, a substantial portion of a ripple current occurring at the DC terminal of the inverter flows through the capacitor, thereby increasing the temperature of the capacitor. When the temperature of the capacitor is increased to a predetermined degree or greater, an adverse effect may occur in the performance of the capacitor. For the motor driving system, a solution capable of preventing the temperature of the capacitor from being excessively increased is required.

In the related art, to prevent the temperature of the capacitor from being excessively increased, over-temperature protection for the capacitor has been performed by totalizing current detection values detected using a current sensor disposed on an AC terminal of the inverter, i.e. a current sensor detecting a driving current supplied to the motor. For example, in the related art, a method is provided for predetermining a reference totalized value serving as a limitation reference for the temperature of the capacitor, and when a totalized value of current detected by the current sensor disposed on the AC terminal of the inverter exceeds the reference totalized value, the temperature is prevented from further increasing by reducing (or derating) the torque of the motor has been used.

However, such an over-temperature protection for a capacitor of the related art has relatively-lower accuracy in estimation of the temperature of the capacitor, since the estimation is performed based on a totalized value of current detected by the AC terminal of the inverter, instead of by the DC terminal of the inverter on which the capacitor is disposed.

The information disclosed in the section is merely for the enhancement of understanding of the background of the disclosure, and should not be taken as an acknowledgment or as any form of suggestion that this information forms a prior art that would already be known to a person skilled in the art.

SUMMARY

Accordingly, the present disclosure provides an over-temperature protection system and method for a DC capacitor of an inverter, in which the temperature of a direct current (DC) capacitor connected to a DC terminal of the inverter may be prevented from excessively increasing by allowing a ripple generated by switching of the inverter to flow through the DC capacitor when the current or temperature of the DC capacitor is not directly detected by a sensor.

According to one aspect of the present disclosure, an over-temperature protection system for a DC capacitor of an inverter, may include: a capacitor configured to generate a DC voltage on both terminals thereof; an inverter configured to generate the DC voltage generated on the both terminals of the capacitor into an AC voltage and supply the AC voltage to a motor; and a controller configured to induce a ripple current of the capacitor based on a driving point determined by a torque and a speed of rotation of the motor and determine whether the capacitor is in an over-temperature state based on a totalized value of the ripple current.

According to an exemplary embodiment of the present disclosure, the controller may include a ripple current data map in which the driving point-specific ripple current is stored. Additionally, the controller may include a ripple coefficient data map in which a driving point-specific ripple coefficient is stored, and may be configured to induce the ripple current by multiplying a three-phase current, supplied to the motor by the inverter, with the ripple coefficient.

The ripple current data map may be generated by: applying a modulation index and a power factor, predetermined according to the driving point, to the ripple coefficient expressed by the following formula:

$$\sqrt{MI\left\{\frac{\sqrt{3}}{2\pi} + \cos^2\emptyset\left(\frac{2\sqrt{3}}{\pi} - \frac{9}{8}MI\right)\right\}},$$

wherein the MI is the modulation index, and the Ø is the power factor; and multiplying a value to which the modulation index and the power factor are applied with the three-phase current of the motor predetermined according to the driving point.

Further, the ripple coefficient data map may be generated by applying a modulation index and a power factor, predetermined according to the driving point, to the ripple coefficient expressed by following formula:

$$\sqrt{MI\left\{\frac{\sqrt{3}}{2\pi} + \cos^2\phi\left(\frac{2\sqrt{3}}{\pi} - \frac{9}{8}MI\right)\right\}},$$

wherein the MI is the modulation index, and the Ø is the power factor.

The controller may be configured to determine the driving point based on the speed of rotation of the motor calculated using a torque command of the motor and a detection value of a rotor position detection sensor configured to detect a position of a rotor of the motor. According to an exemplary/embodiment of the present disclosure, the controller may be configured to calculate the totalized value of the ripple current by adding an excessive portion when a magnitude of the ripple current is greater than a magnitude of a continuous current and subtracting an insufficient portion when the magnitude of the ripple current is less than the magnitude of the continuous current. When the totalized value reaches a predetermined over-temperature determination reference, the controller may be configured to determine that the capacitor is in the over-temperature state and reduce the torque of the motor.

According to an exemplary embodiment of the present disclosure, an over-temperature protection method may be provided for a DC capacitor of an inverter applied to a motor driving system including a capacitor configured to generate a DC voltage on both terminals thereof and an inverter configured to convert the DC voltage generated on the both terminals of the capacitor into an AC voltage and supply the AC voltage to a motor. The method may include: collecting a torque and a speed of rotation of the motor; inducing a ripple current of the capacitor that corresponds to the torque and the speed of rotation of the motor collected based on a ripple current data map or a ripple coefficient data map previously stored, using a driving point-specific ripple current or a driving point-specific ripple coefficient determined by the torque and the speed of rotation of the motor; and totalizing the induced ripple current, and when a value of the totalized ripple current reaches a predetermined over-temperature determination reference, determining that the capacitor is in an over-temperature state and reducing the torque of the motor.

According to an exemplary embodiment of the present disclosure, the inducing may include: inducing a ripple coefficient of the capacitor that corresponds to the torque and the speed of rotation of the motor collected based on the ripple coefficient data map in which the driving point-specific ripple coefficient is stored; and inducing the ripple current by multiplying a three-phase current, provided to the motor by the inverter, with the induced ripple coefficient. The ripple current data map may be generated by: applying a modulation index and a power factor, predetermined according to the driving point, to the ripple coefficient expressed by following formula:

$$\sqrt{MI\left\{\frac{\sqrt{3}}{2\pi} + \cos^2\phi\left(\frac{2\sqrt{3}}{\pi} - \frac{9}{8}MI\right)\right\}},$$

wherein the MI is the modulation index, and the Ø is the power factor; and multiplying a value to which the modulation index and the power factor are applied with the three-phase current of the motor predetermined according to the driving point.

Additionally, the ripple coefficient data map may be generated by applying a modulation index and a power factor, predetermined according to the driving point, to the ripple coefficient expressed by following formula:

$$\sqrt{MI\left\{\frac{\sqrt{3}}{2\pi} + \cos^2\phi\left(\frac{2\sqrt{3}}{\pi} - \frac{9}{8}MI\right)\right\}},$$

wherein the MI is the modulation index, and the Ø is the power factor. According to an exemplary embodiment of the present disclosure, the collecting may include collecting the speed of rotation of the motor calculated using a torque command of the motor and a detection value of a rotor position detection sensor configured to detect a position of a rotor of the motor. The totalized value of the ripple current may be calculated by adding an excessive portion when a magnitude of the ripple current is greater than a magnitude of a continuous current and subtracting an insufficient portion when the magnitude of the ripple current is less than the magnitude of the continuous current.

As described above, the over-temperature protection system and method for a DC capacitor of an inverter according to a variety of exemplary embodiments of the present disclosure may more accurately induce the ripple current according to the driving point or the ripple coefficient for calculation of the ripple current, in accordance with a modulation index (MI) and a power factor determined according to the driving point of the motor. Accordingly, the over-temperature protection system and method for a DC capacitor of an inverter according to a variety of embodiments of the present disclosure may more accurately estimate an inverter input ripple current using the preinstalled motor current sensor without a separate current sensor configured to detect the inverter input current or the capacitor current at the inverter DC input terminal.

In addition, the over-temperature protection system and method for a DC capacitor of an inverter according to a variety of exemplary embodiments of the present disclosure may improve the accuracy of the operation of estimating the temperature of the DC capacitor at the inverter DC input terminal by totalizing the inverter input ripple coefficient or the inverter input ripple current estimated according to the driving point using the ripple current data map. The over-temperature protection for the capacitor may be efficiently performed to overcome the problems, such as the damage to the capacitor due to the over-temperature. In addition, the over-temperature protection system and method for a DC capacitor of an inverter according to a variety of exemplary embodiments of the present disclosure may set an optimized capacity to the inverter DC input terminal capacitor by optimizing the over-temperature protection for the capacitor by the current totalization, thereby increasing the power density of the inverter and improving the cost competitiveness of the inverter.

The effects of the present disclosure are not limited to the aforementioned description, and other effects not explicitly disclosed herein will be clearly understood by those skilled in the art to which the present disclosure pertains from the description provided hereinafter.

BRIEF DESCRIPTION OF THE DRAWINGS

The above and other objectives, features, and advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an over-temperature protection system and method for a DC capacitor of an inverter according to a variety of exemplary embodiments of the present disclosure will be described in detail with reference to the accompanying drawings.

Figure 1:
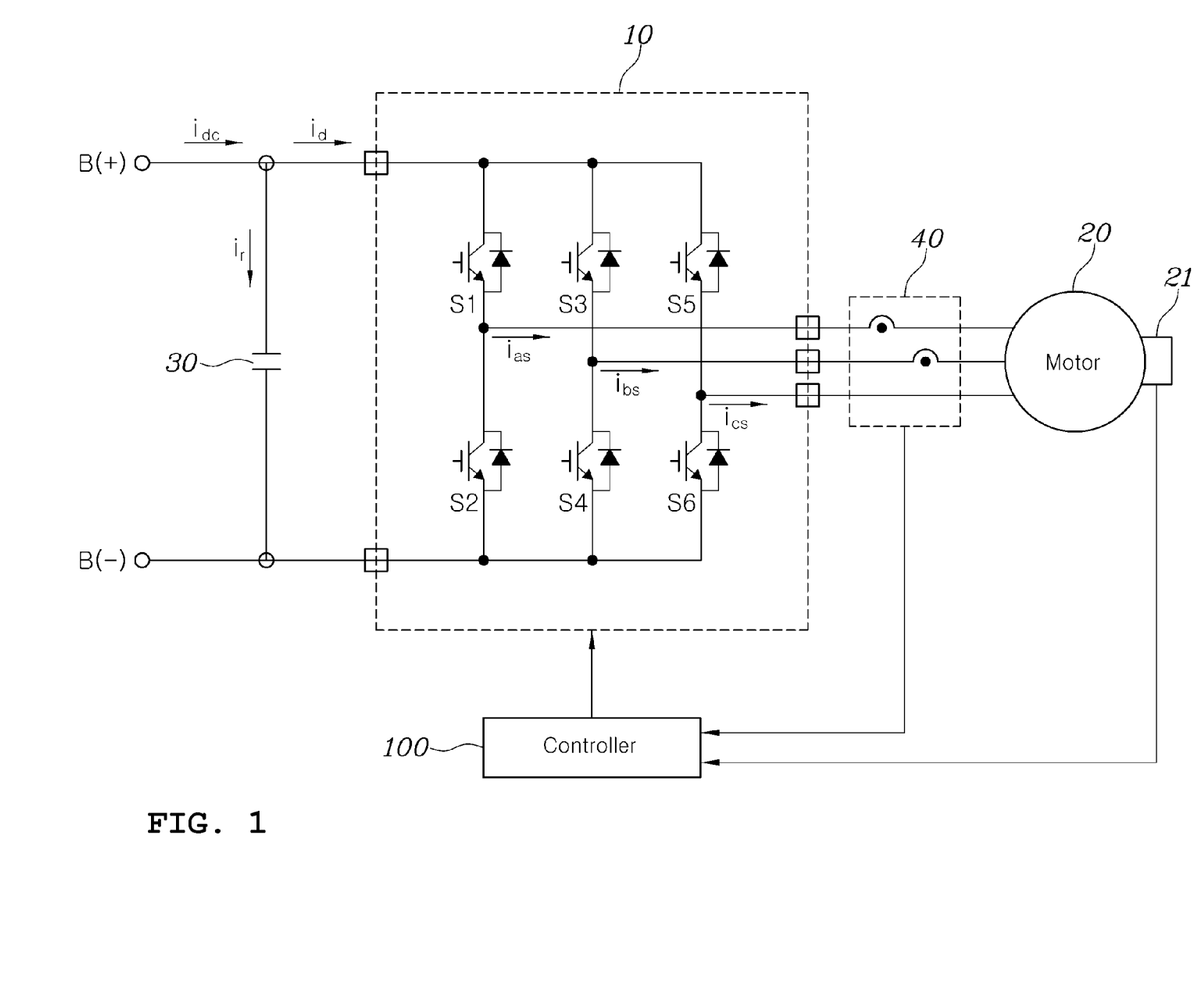
FIG. 1 is a circuit diagram illustrating an over-temperature protection system for a DC capacitor of an inverter according to exemplary embodiments of the present disclosure.

FIG. 1 is a circuit diagram illustrating an over-temperature protection system and method for a DC capacitor of an inverter according to exemplary embodiments of the present disclosure. Referring to FIG. 1, the over-temperature protection system for a DC capacitor of an inverter according to exemplary embodiments of the present disclosure may be configured to determine whether a capacitor 30 connected to a DC input terminal of an inverter 10 configured to convert a DC voltage into an AC voltage is in an over-temperature state, and in response to determining that the capacitor 30 has an over-temperature, may be configured to reduce the torque of the motor 20 to limit an increase in the temperature of the capacitor 30.

Specifically, the over-temperature protection system for a DC capacitor of an inverter according to exemplary embodiments of the present disclosure may include: the capacitor 30 configured to generate a DC voltage on both terminals thereof; the inverter 10 configured to convert the DC voltage generated on the both terminals of the capacitor 30 into an AC voltage and supply the AC voltage to the motor 20; and a controller 100 configured to induce a ripple current it of the capacitor 30 based on a driving point determined by a torque and a speed of rotation of the motor 20 and determine whether the capacitor 30 is in the over-temperature based on a totalized value of the ripple current $i_r$.

The inverter 10 may be configured to convert a DC voltage into a plurality of AC voltages, in response to the pulse width modulation control of a plurality of switching elements S1 to S6, and output the plurality of AC voltages. For example, the inverter 10 may be configured to convert a DC voltage into an AC voltage in response to space vector pulse width modulation (SVPWM) control. When the plurality of switching elements S1 to S6 are on-off controlled using a modulation method, such as the space vector pulse width modulation (SVPWM), the ripple current may be generated on a DC input terminal of the inverter 10, i.e. a terminal to which the capacitor 30 is connected, to heat the capacitor 30 having lower impedance compared to a high frequency while passing through the capacitor 30.

In the related art, an over-temperature protection operation has been performed by estimating a temperature by totalizing an output of a current sensor 40 configured to detect the magnitude of a current supplied to the motor 20 from the inverter 10. However, such a related-art method is unable to accurately estimate the ripple current flowing through the capacitor 30, and thus, has a significantly low level of accuracy.

According to a plurality of embodiments of the present disclosure, the controller 100 may be configured to induce the ripple current using ripple current information that corresponds to a corresponding driving point in a data map, in which the ripple current information regarding the driving point is previously set, based on the driving point determined by the torque and speed of the motor 20, and determine whether the capacitor 30 is in the over-temperature state based on a totalized value of the ripple current. Accordingly, a plurality of exemplary embodiments of the present disclosure may significantly improve the accuracy of the determination of whether the capacitor 30 is in the over-temperature state, compared to the related-art method of simply determining whether the capacitor 30 is in the over-temperature state based on a motor current detected by the current sensor 40.

Hereinafter, a data map provided in the controller 100 to calculate a ripple current will be described in more detail. A three-phase current $i_{as}$, $i_{bs}$, and $i_{cs}$ provided to the motor 20 may be defined as in the following Formula 1.

$$i_{as} = \sqrt{2} \times I_0 \sin(\theta - \emptyset)$$
$$i_{bs} = \sqrt{2} \times I_0 \sin\left(\theta - \frac{2\pi}{3} - \emptyset\right)$$
$$i_{cs} = \sqrt{2} \times I_0 \sin\left(\theta + \frac{2\pi}{3} - \emptyset\right)$$

Formula 1

In Formula 1, $I_0$ is a root mean square (RMS) value of the three-phase current, and Ø is a power factor corresponding to a phase difference between a phase current and a phase voltage.

Figure 2:
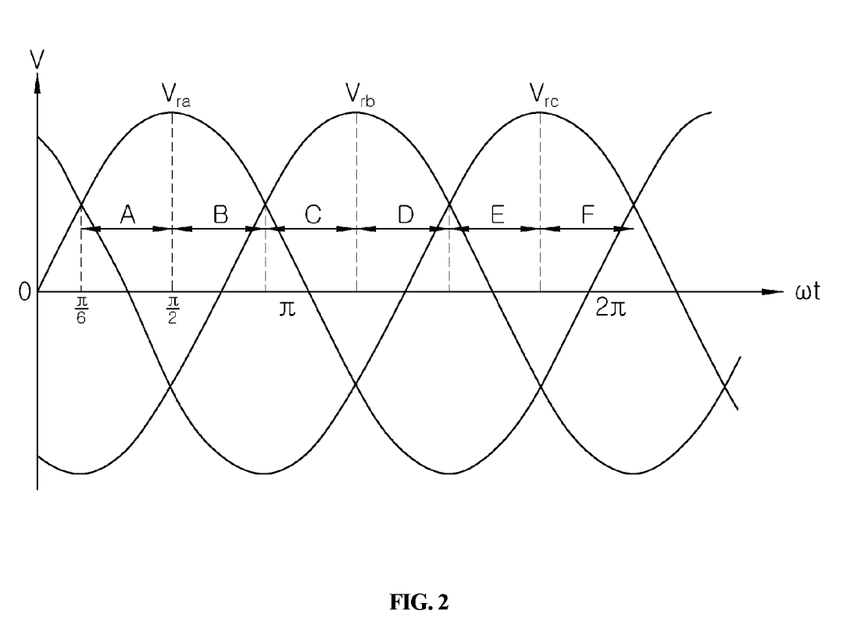
FIG. 2 is a waveform diagram illustrating an example of a three-phase voltage reference signal provided from the inverter to the motor in the over-temperature protection system for a DC capacitor of an inverter according to exemplary embodiments of the present disclosure.
Figure 3A:
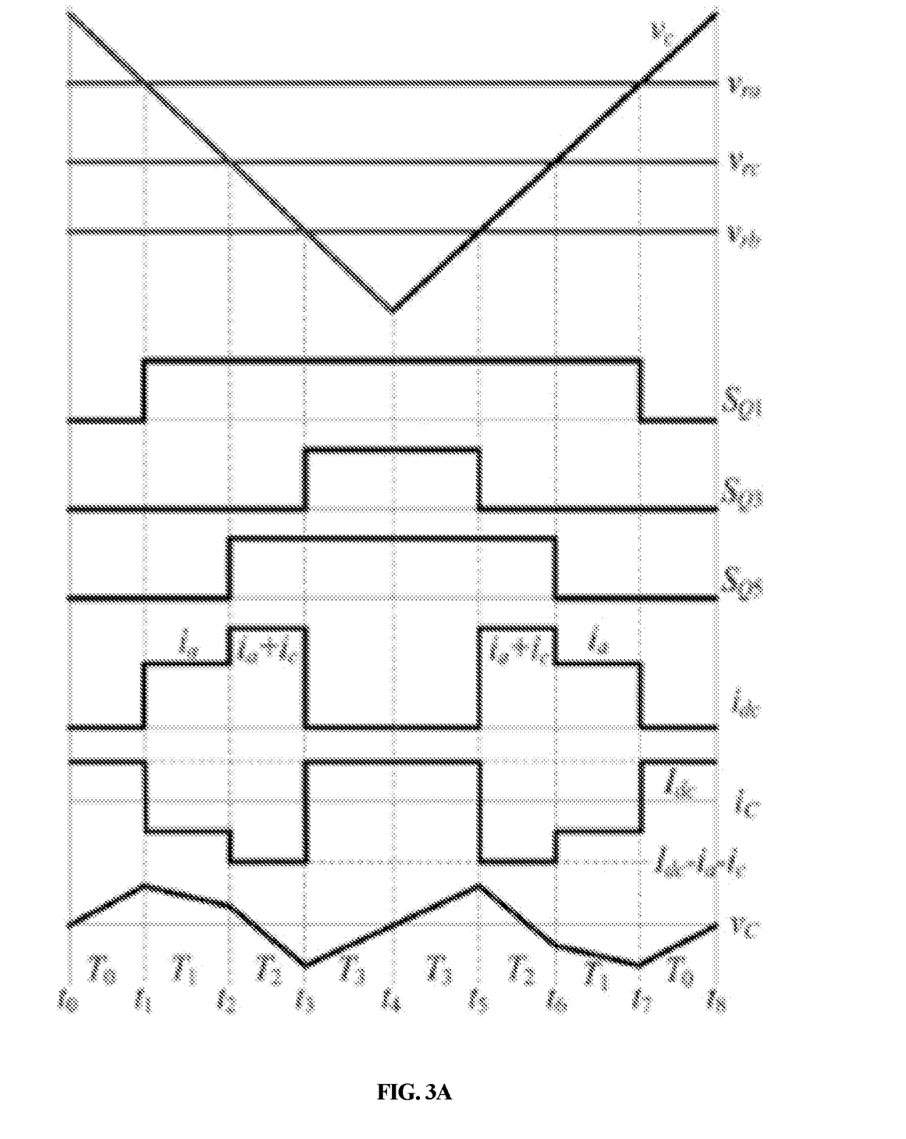
FIGS. 3A to 3F are diagrams illustrating an inverter input ripple current and an inverter input ripple voltage according to the switching pattern in A-F sections illustrated in FIG. 2 according to exemplary embodiments of the present disclosure.
Figure 3B:
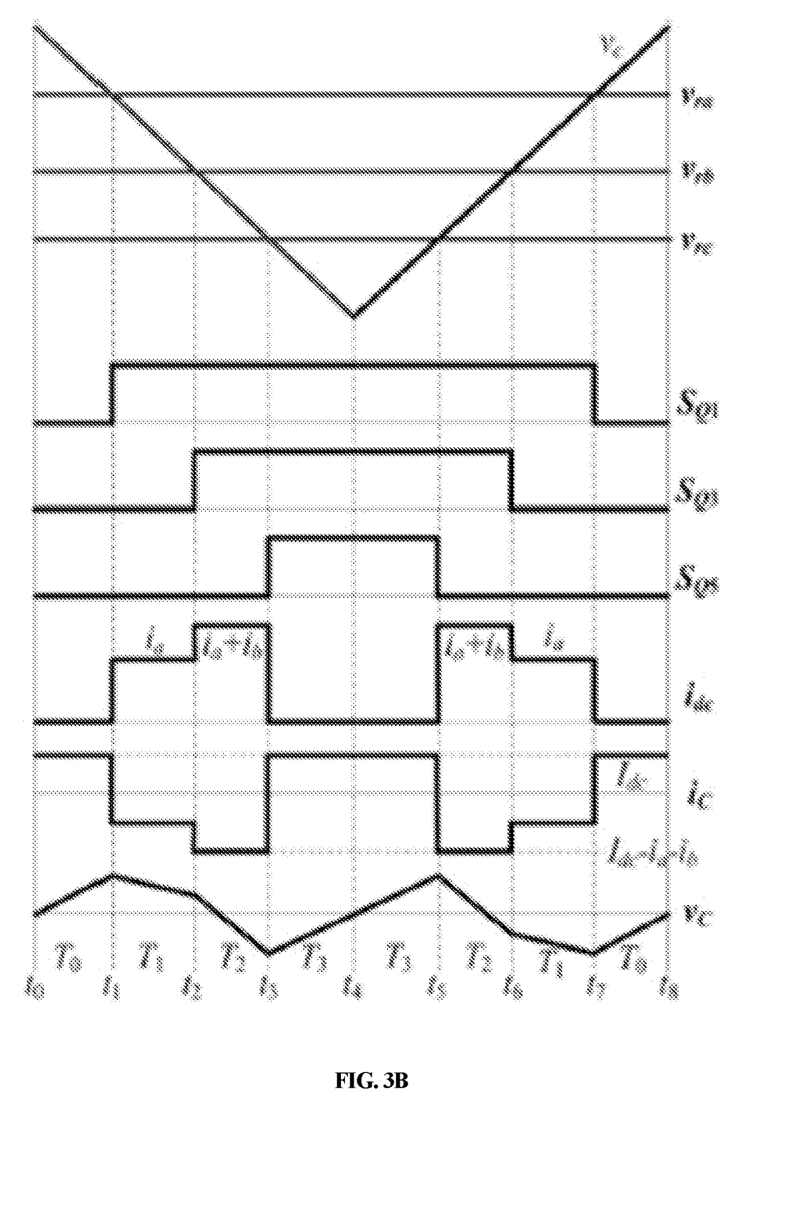
Figure 3C:
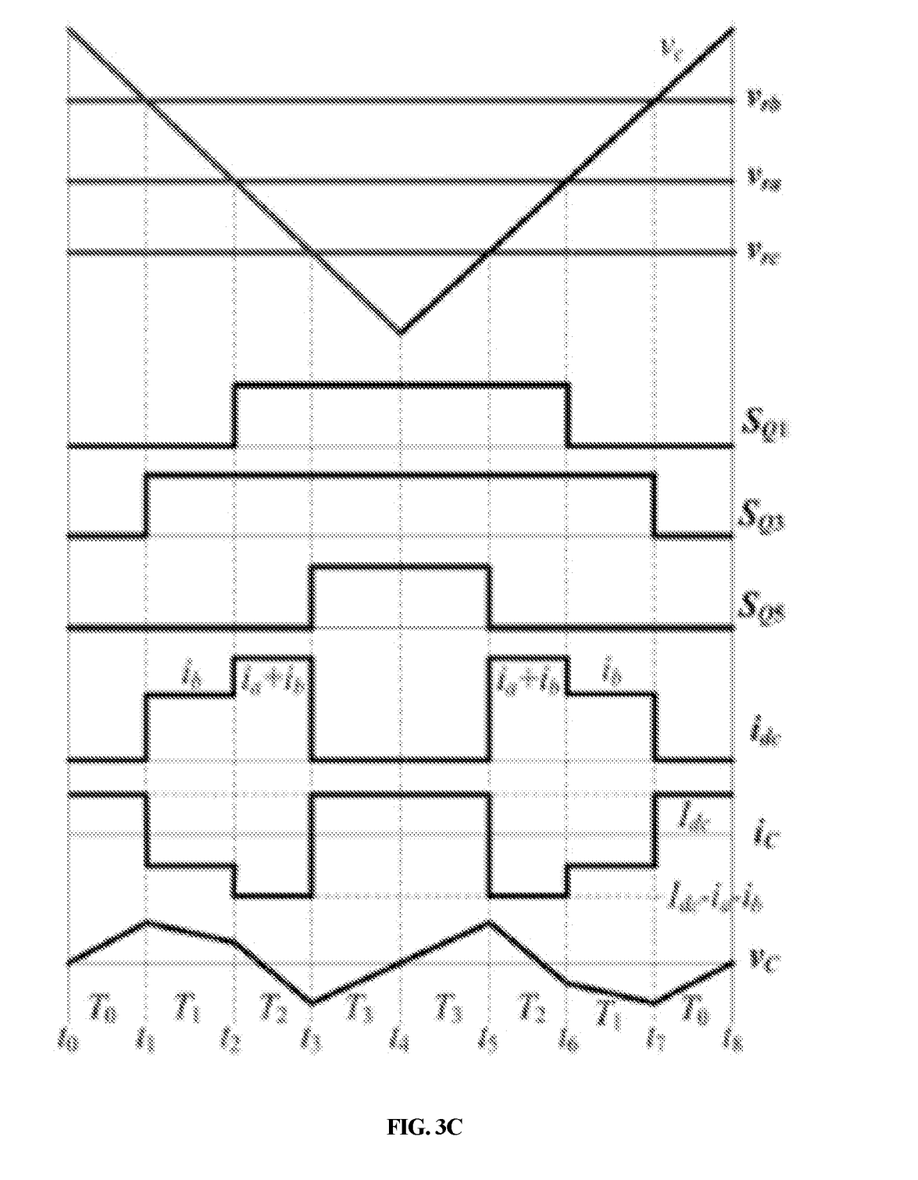
Figure 3D:
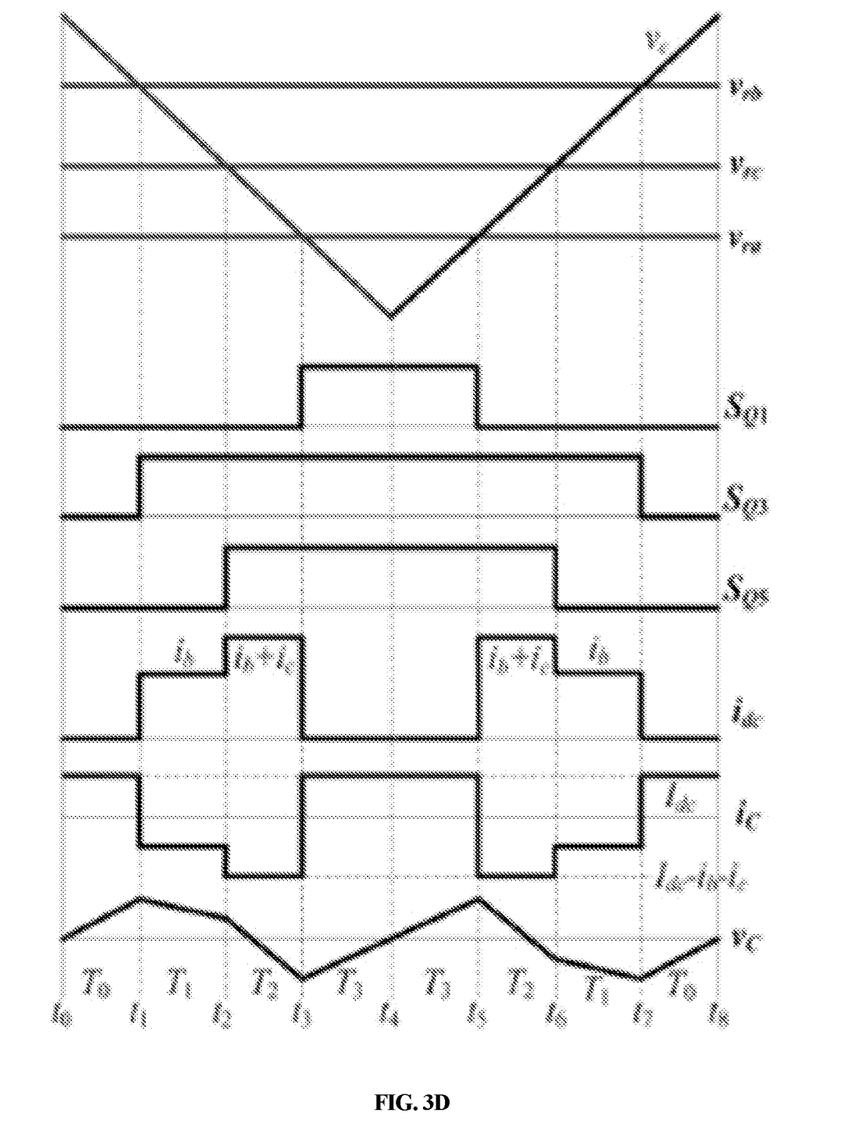
Figure 3E:
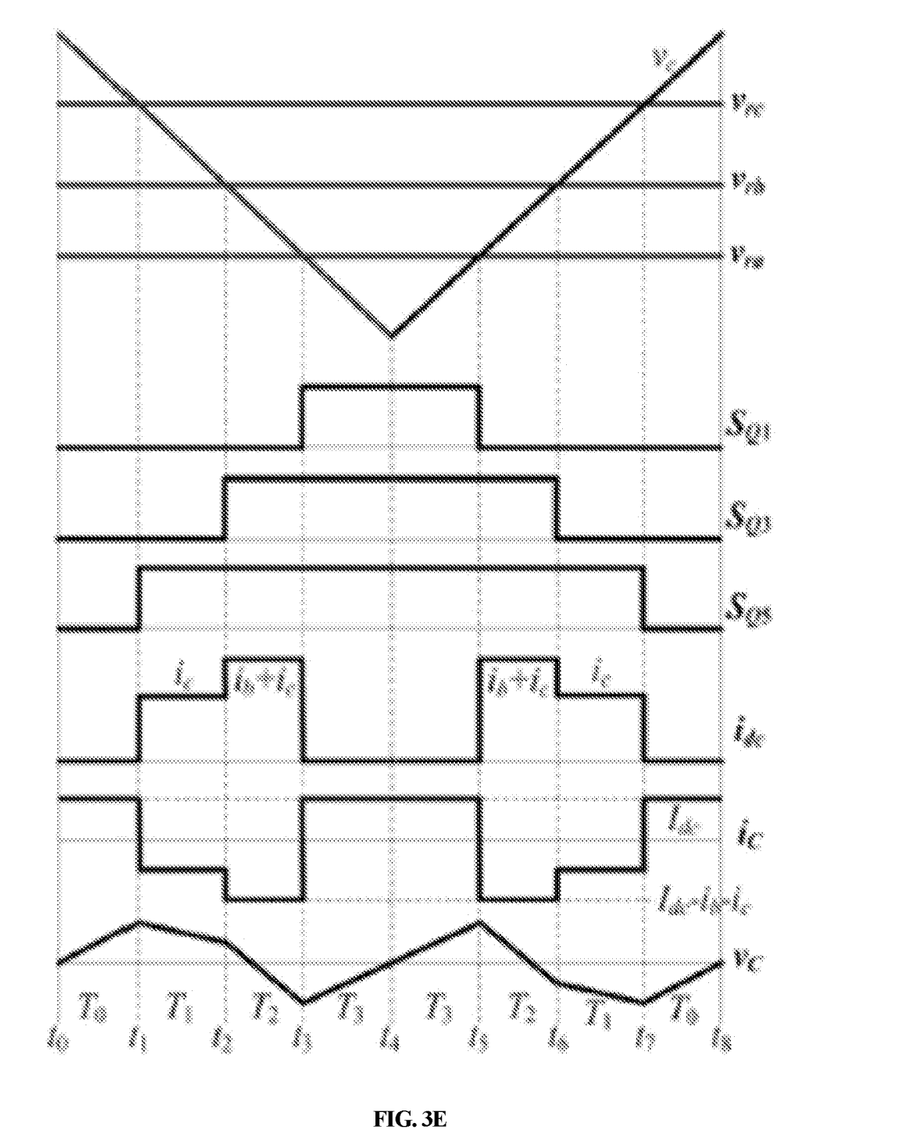
Figure 3F:
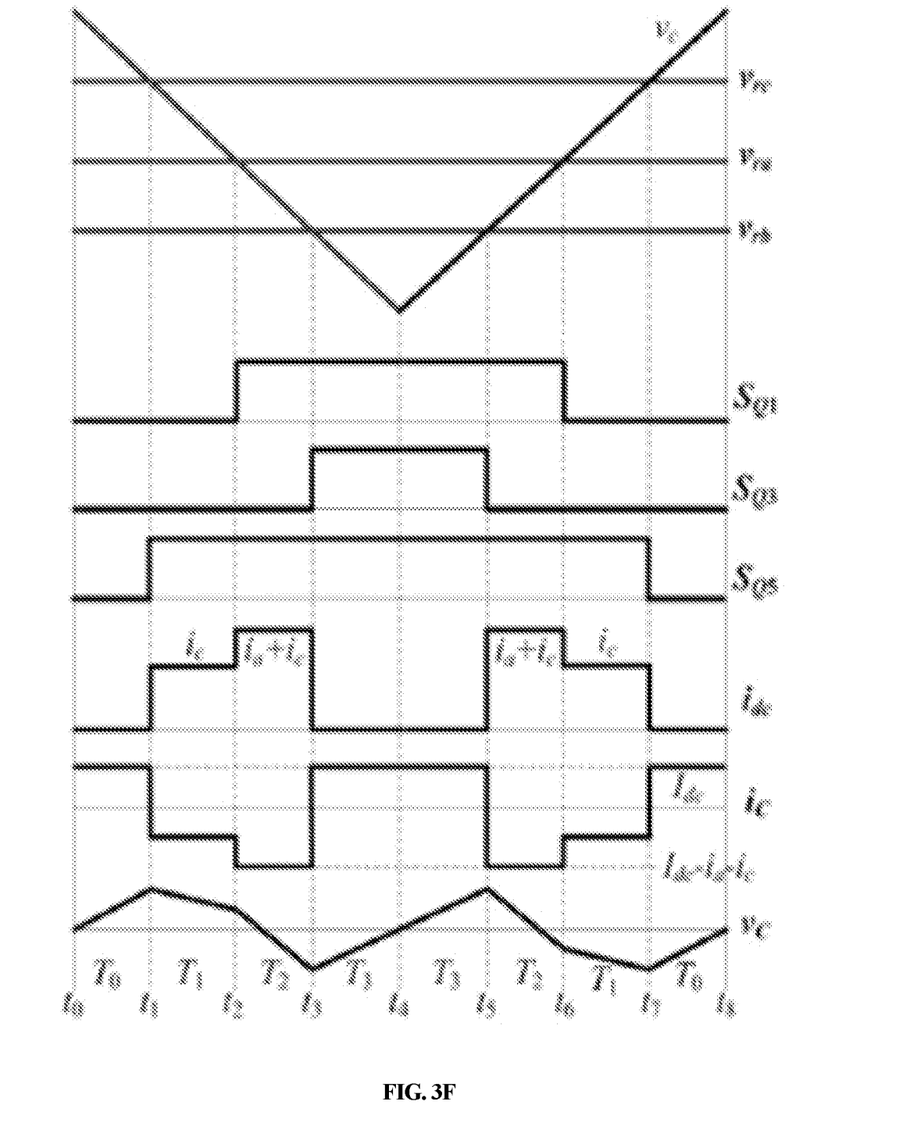

FIG. 2 is a waveform diagram illustrating an example of a three-phase voltage reference signal provided from the inverter to the motor in the over-temperature protection system for a DC capacitor of an inverter according to exemplary embodiments of the present disclosure, and FIGS. 3A to 3F are diagrams illustrating an inverter input ripple current and an inverter input ripple voltage according to the switching pattern in A-F sections illustrated in FIG. 2.

The three-phase reference signal $v_{ra}$, $v_{rb}$, and $v_{rc}$ may be compared with a triangular wave $v_c$ of a predetermined switching frequency, as illustrated in FIGS. 3A to 3F, and according to the comparison result of the three-phase reference signal $v_{ra}$, $v_{rb}$, and $v_{rc}$, the on-off state $S_{Q1}$, $S_{Q3}$, and $S_{Q5}$ of the switching elements S1 to S6 may be determined. In addition, a current supplied to the motor may be determined according to the switching state of the switching elements S1 to S6. In FIGS. 3A to 3F, the three-phase voltage reference signal having the shape of a sine wave is represented as having a constant value, since the switching frequency of the sine wave $v_c$ is significantly greater than the frequency of the three-phase reference signal $v_{ra}$, $v_{rb}$, and $v_{rc}$, which is a sine wave.

According to the result illustrated in FIGS. 2 and 3A to 3F, a current $i_d$ input to the inverter 10 may be expressed using a combination of switching states, as in the following Formula 2.

$$i_d = Q_1 i_{as} + Q_3 i_{bs} + Q_5 i_{cs}$$

Formula 2

In Formula 2, $Q_1$, $Q_3$, and $Q_5$ may indicate the on-off state of the switching elements S1, S3, and S5 in the inverter 10, and may have a value 0 or 1.

In addition, the inverter input current may be RMS processed for a single period of the switching frequency to be expressed in the following Formula 3.

$$I_d^2 = \frac{1}{T_s} \int_{t_0}^{t_0+T_s} I_d^2 dt$$

Formula 3

In Formula 3, $T_s$ indicates the switching period.

When an average of the inverter input current in the section A in FIG. 2 is calculated using the RMS value inducted as in Formula 3, a result as expressed in the following Formula 4 may be obtained.

$$I_{d,av}^2 = \frac{3}{\pi} \int_{\pi/6}^{\pi/2} I_d^2 d\theta_r = \frac{3\sqrt{3}}{2\pi} MI \times I_0^2 \left[1 + \frac{2}{3} \cos 2\emptyset \right]$$

Formula 4

In Formula 4, MI may be a modulation index that indicates a magnitude (peak) ratio of an inverter output (phase voltage) reference wave with respect to the half (½) of a voltage of a DC input terminal of the inverter or indicates a magnitude (peak) ratio of the inverter output (phase voltage) reference wave with respect to a maximum value of the inverter output (phase voltage) reference wave.

As illustrated in FIGS. 3A to 3F, in the sections A to F, substantially the same result is induced while the switching element that is turned on-off is changed. Thus, the same calculation result as that of Formula 4 regarding the section A may be obtained. In addition, the DC current input to the inverter 10 may be expressed as in the following Formula 5.

$$I_{dc} = \frac{3}{2\sqrt{2}} MI \times I_0 \cos \emptyset$$

Formula 5

Since the DC current and the ripple current input to the inverter 10 have an orthogonal relationship, the RMS value of the inverter input ripple current may be calculated by obtaining a square root of a value obtained by reducing a square of the DC current input to the inverter 10 from a square of an entire current input to the inverter 10, as expressed in the following Formula 6.

$$I_r = \sqrt{I_{d,av}^2 - I_{dc}^2} = I_0 \sqrt{MI \left\{ \frac{\sqrt{3}}{2\pi} + \cos^2 \emptyset \left( \frac{2\sqrt{3}}{\pi} - \frac{9}{8} MI \right) \right\}}$$

Formula 6

According to Formula 6, the term $$\sqrt{MI \left\{ \frac{\sqrt{3}}{2\pi} + \cos^2 \emptyset \left( \frac{2\sqrt{3}}{\pi} - \frac{9}{8} MI \right) \right\}}$$

may be defined as a ripple coefficient. According to Formula 6, the inverter input ripple current coefficient may be regarded as being a function of a modulation index (MI) and an empty set Ø (power factor).

Figure 4:
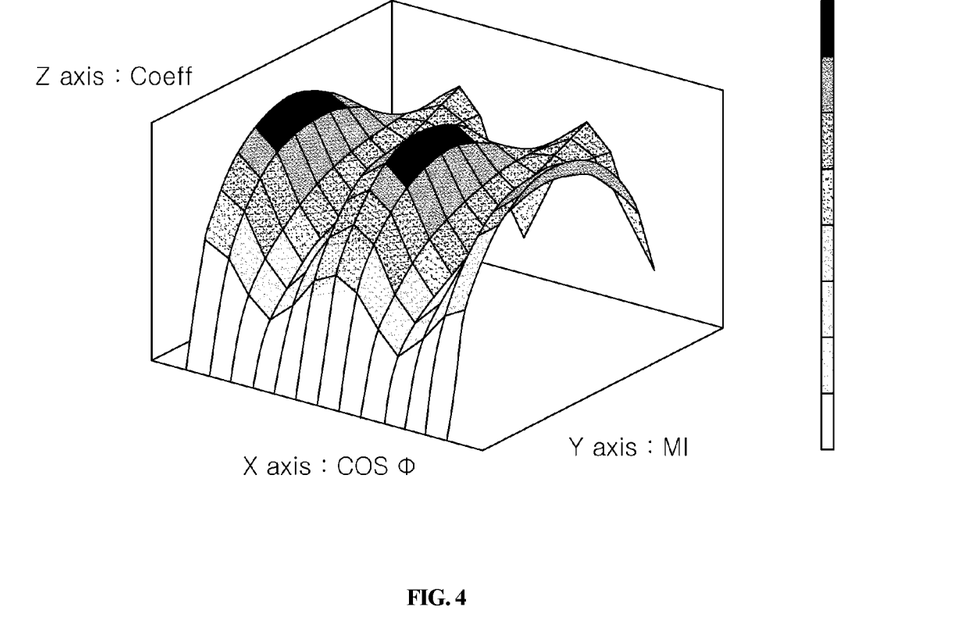
FIG. 4 is a diagram illustrating the ripple coefficient used in the over-temperature protection system for a DC capacitor of an inverter according to exemplary embodiments of the present disclosure.

FIG. 4 is a diagram illustrating the ripple coefficient used in the over-temperature protection system for a DC capacitor of an inverter according to exemplary embodiments of the present disclosure. As illustrated in FIG. 4, the X axis is set to be the cos Ø axis related to the power factor, the Y axis is set to be the MI axis, and a ripple coefficient corresponding to each value of the X-Y axes may be plotted on the z axis.

A variety of exemplary embodiments of the present disclosure is characterized in that the ripple coefficient is applied to over-temperature protection for the capacitor 30. In other words, the over-temperature protection for the capacitor 30 may be enabled by inducing the ripple current using the ripple coefficient, instead of additionally providing a current sensor configured to detect the ripple current flowing through the DC capacitor 30 of the inverter 10 or a temperature sensor configured to detect the temperature of the capacitor 30.

Figure 5:
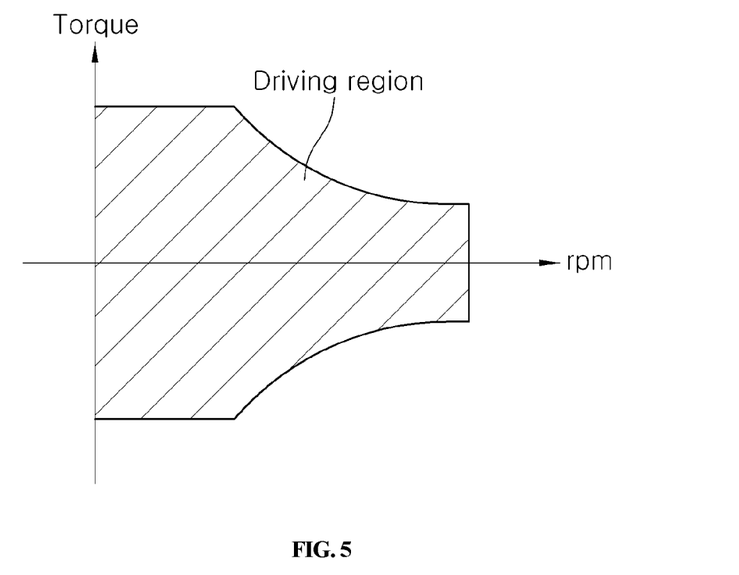
FIG. 5 is a diagram illustrating the driving point of a typical motor according to exemplary embodiments of the present disclosure.

FIG. 5 is a diagram illustrating the driving point of a typical motor. As illustrated in FIG. 5, a drivable region of the motor 20, i.e. a region in which the motor 20 is drivable, may be determined according to the torque and the speed of rotation thereof. In addition, a plurality of factors necessary to control the motor 20 may be predetermined according to the driving points determined by the torque and the speed of rotation within the drivable region.

The MI and the power factor may be predetermined according to each of the driving points determined by the torque and the speed of rotation of the motor 20. In other words, the MI and the power factor applied at each driving point determined by the torque and the speed of rotation of the motor 20 according to unique characteristics of the motor 20 may be predetermined. Thus, when the MIs and the power factors determined at corresponding driving points, according to the driving points determined by the torque and the speed of rotation of the motor, are input to Formula 6, the ripple coefficient may be predetermined according to the driving point.

In addition, the RMS value of the three-phase current at the driving point determined by the torque and the speed of rotation of the motor 20 according to unique characteristics of the motor 20 may also be predetermined. Thus, when the three-phase RMS value at each driving point is multiplied with the ripple coefficient determined according to the driving point, the ripple current may be predetermined according to the driving point.

According to an exemplary embodiment of the present disclosure, the controller 100 may be configured to store the data map in which the ripple coefficient or the ripple current predetermined according to the driving point is written. During the operation of the motor 20, information regarding the torque and the speed of rotation of the motor 20 may be input, and thus, the ripple coefficient or ripple current that corresponds to the torque and the speed of rotation of the motor 20 input from the data map may be induced.

When the controller 100 has stored the data map in which the ripple coefficient is written, the controller 100 may be provided with a current detection value from the current sensor configured to detect the three-phase current supplied to the motor 20 by the inverter 10, and may be configured to induce the ripple current by multiplying the ripple coefficient, induced from the data map based on the driving point, with the three-phase current (or the RMS value of the three-phase current).

Figure 6:
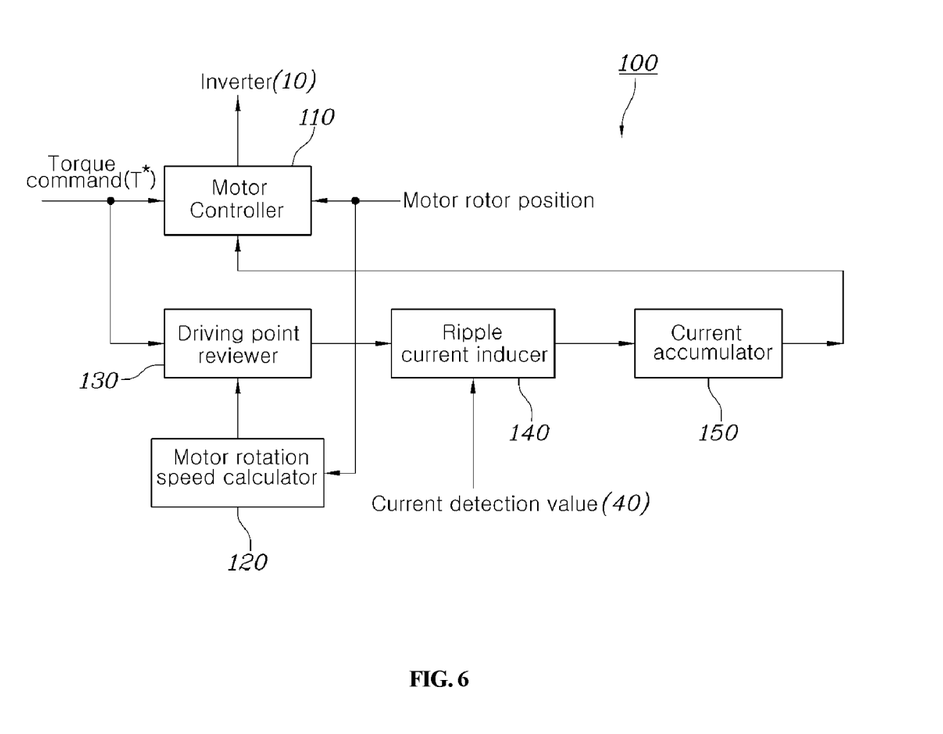
FIG. 6 is a block diagram illustrating the configuration of the controller of the over-temperature protection system for a DC capacitor of an inverter according to exemplary embodiments of the present disclosure.

FIG. 6 is a block diagram illustrating the configuration of the controller of the over-temperature protection system for a DC capacitor of an inverter according to exemplary embodiments of the present disclosure. Referring to FIG. 6, the controller 100 may include a motor controller 110. The motor controller 110 may be configured to drive the switching elements in the inverter 10 by pulse width modulation by performing current control and voltage control based on a torque command T* input from an external source and the three-phase current detected by the current sensor 40. Detailed description of the operation of the motor controller 110 controlling the driving of the motor 10 will be omitted, since such information corresponds to well-known technology of a technical field to which the present disclosure relates and is not directly related to the present disclosure.

The controller 100 may include driving point reviewer 130. The driving point reviewer 130 may be configured to receive the torque and the speed of rotation of the motor to which the ripple coefficient data map or the ripple current data map is to be applied. The speed of rotation of the motor 20 may be calculated by a motor rotation speed calculator 120, based on a rotor position detection value detected by a motor rotor position sensor 21 disposed on the motor 20. Since the method of calculating the speed of rotation by the motor rotation speed calculator 120 is also well known in the art, a detailed description thereof will be omitted. The torque command and the speed of rotation of the motor input by the driving point reviewer 130 are provided to a ripple current inducer 140.

Figure 7:
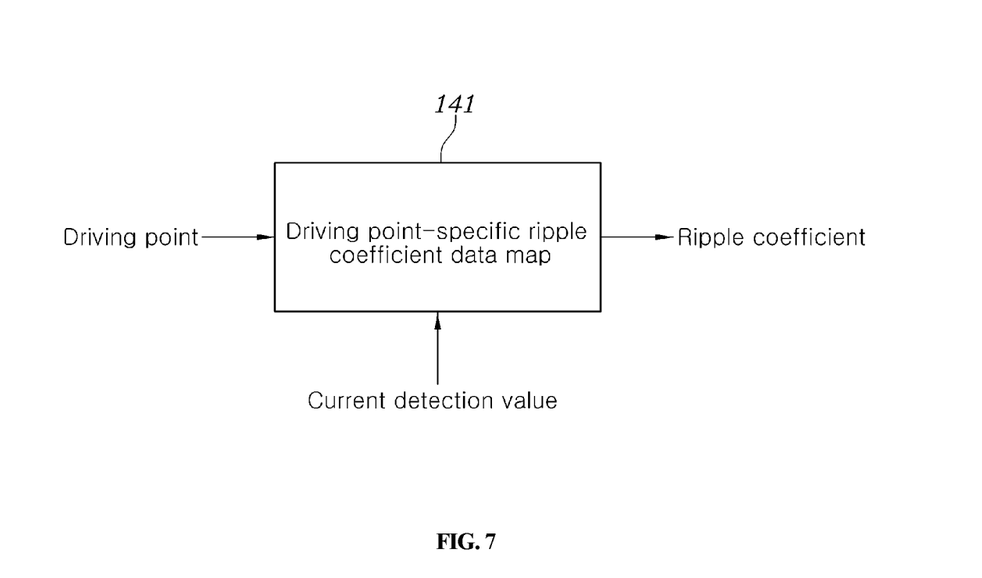
FIGS. 7 and 8 are diagrams illustrating a ripple coefficient data map and a ripple current data map stored in the controller of the over-temperature protection system for a DC capacitor of an inverter according to exemplary embodiments of the present disclosure.
Figure 8:
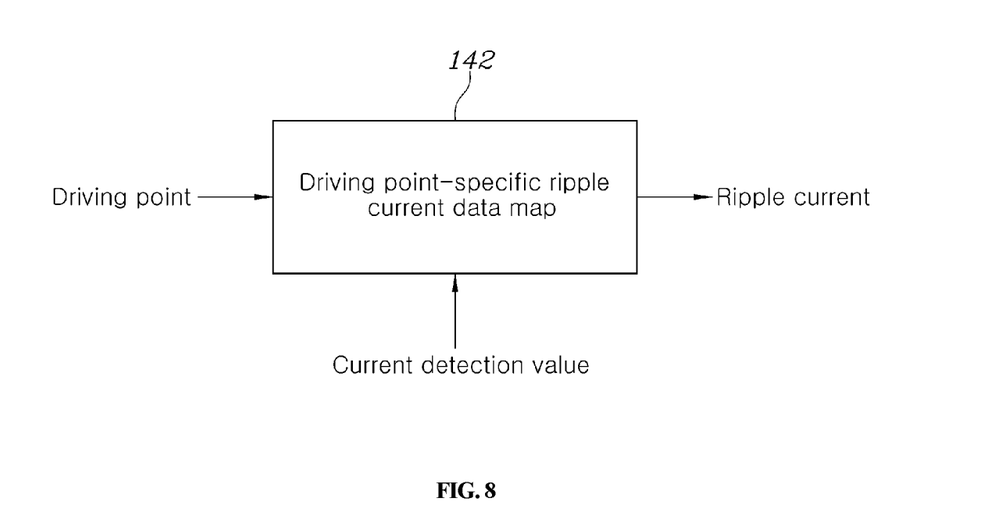

FIGS. 7 and 8 are diagrams illustrating a ripple coefficient data map and a ripple current data map stored in the controller of the over-temperature protection system for a DC capacitor of an inverter according to exemplary embodiments of the present disclosure. As illustrated in FIGS. 7 and 8, the ripple current inducer 140 may be configured to induce the ripple coefficient or the ripple current by reading the ripple coefficient or the ripple current corresponding to the torque command and the speed of rotation of the motor input by a ripple coefficient data map 141 or a ripple current data map 142.

When the ripple coefficient data map is stored in the ripple current inducer 140, the ripple current inducer 140 may be configured to calculate the ripple current by multiplying the ripple coefficient induced from the ripple coefficient data map 141 with (the RMS value of) the three-phase current of the motor input by the current sensor 40. A current accumulator 150 of the controller 100 may be configured to estimate the temperature of the capacitor 30 by totalizing the ripple current induced by the ripple current inducer 140. When the totalized value of the ripple current is greater than a reference value predetermined for over-temperature determination for the capacitor 30, the current accumulator 150 may be configured to determine that the capacitor 30 is in an over-temperature state, and provide the motor controller 110 with a derating or reducing signal by which the operation of the motor 10 may be derated.

Figure 9:
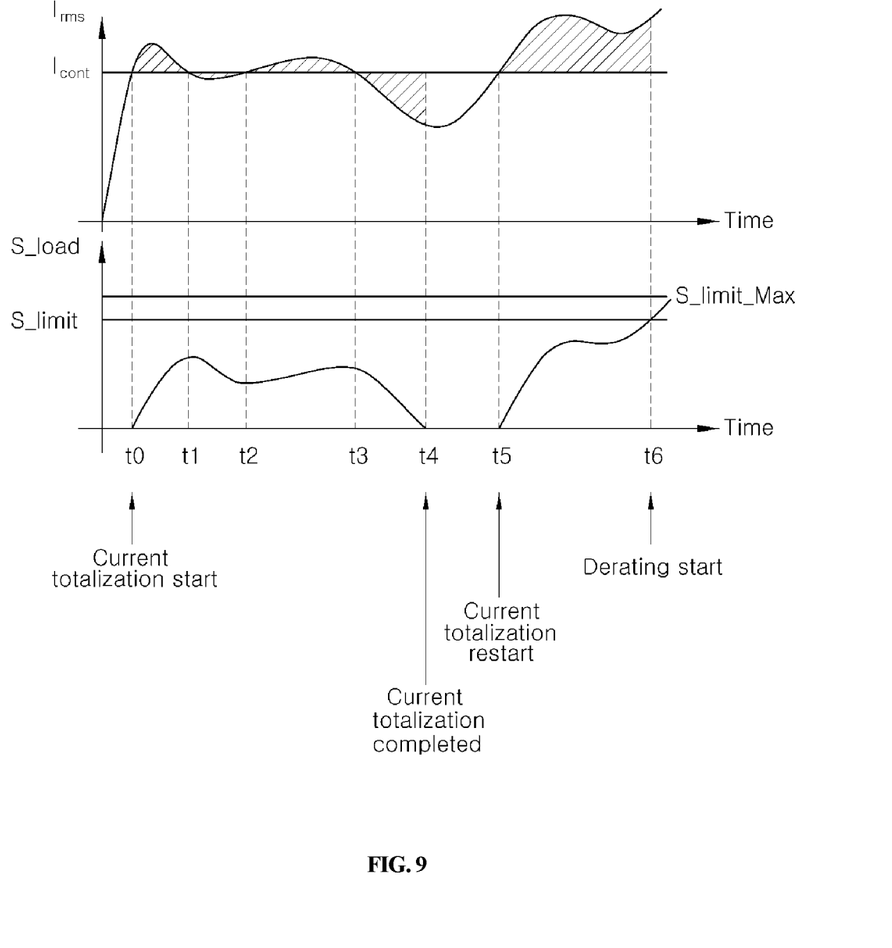
FIG. 9 is a graph illustrating an example of current totalization by the controller of the over-temperature protection system for a DC capacitor of an inverter according to exemplary embodiments of the present disclosure.

FIG. 9 is a graph illustrating an example of current totalization by the controller of the over-temperature protection system for a DC capacitor of an inverter according to exemplary embodiments of the present disclosure. As illustrated in FIG. 9, the current accumulator 150 may be configured to totalize the ripple current based on a continuous current. In particular, the current accumulator 150 may be configured to perform the current totalization by adding an excessive portion when the magnitude of the ripple current is greater than the magnitude of a continuous current $I_{cont}$ and performing subtracting an insufficient portion when the magnitude of the ripple current is less than the magnitude of the continuous current $I_{cont}$.

When the totalized value reaches an over-temperature determination reference $S_{limit}$, the current accumulator 150 may be configured to determine that the capacitor 30 is in the over-temperature state and provide a signal for reducing the torque of the motor to the motor. In particular, the continuous current may be determined to be a magnitude of current conditioned to generate a maximum ripple current when the current continues for a predetermined period of time or greater based on a thermal time constant of the capacitor 30.

The present disclosure also provides an over-temperature protection method for a DC capacitor of an inverter, executed by the above-described controller 100. The over-temperature protection method for a DC capacitor of an inverter according to exemplary embodiments of the present disclosure may include: collecting, by the driving point reviewer 130, a torque and a speed of rotation of the motor 20; inducing, by the ripple current inducer 140, a ripple current of the capacitor 30 based on the ripple current data map or the ripple coefficient data map previously stored; and totalizing, by the current accumulator 150, the calculated ripple current, and when the totalized value reaches a reference value, determining that the capacitor 30 is in an over-temperature state and reducing the torque of the motor to the motor controller 110.

Before the driving point reviewer 130 collects the speed of rotation, a step of calculating, by the motor rotation speed calculator 120, a rotor speed of the motor 20 based on a rotor position detection value output by the rotor position sensor of the motor 20 may be additionally performed. In addition, when the ripple current inducer 140 induces the ripple coefficient using the ripple coefficient data map, inducing of the ripple current may include a calculating the ripple current by multiplying, by the ripple current inducer 140, the induced ripple coefficient and (the RMS value) of the three-phase current of the motor detected by the current sensor 40. The respective steps of the over-temperature protection method for a DC capacitor of an inverter according to exemplary embodiments of the present disclosure may be executed by the internal components of the above-described controller 100. Since specific operations of the steps are understandable from the descriptions of the internal components of the controller 100 so that those skilled in the art could have readily made the present disclosure, repetitive descriptions thereof will be omitted.

As set forth above, the over-temperature protection system and method for a DC capacitor of an inverter according to a variety of exemplary embodiments of the present disclosure may more accurately induce the driving point-specific ripple current or the ripple coefficient for calculation of the ripple current, based on the MI and the power factor determined according to the driving point of the motor. Accordingly, the over-temperature protection system and method for a DC capacitor of an inverter according to a variety of exemplary embodiments of the present disclosure may more accurately estimate an inverter input ripple current using the preinstalled motor current sensor without a separate current sensor configured to detect the inverter input current or the capacitor current at the inverter DC input terminal.

In addition, the over-temperature protection system and method for a DC capacitor of an inverter according to a variety of exemplary embodiments of the present disclosure may improve the accuracy of the operation of estimating the temperature of the DC capacitor at the inverter DC input terminal by totalizing the inverter input ripple coefficient or the inverter input ripple current estimated according to the driving point using the ripple current data map. The over-temperature protection for the capacitor may be efficiently performed to overcome the problems, such as the damage to the capacitor due to the over-temperature. In addition, the over-temperature protection system and method for a DC capacitor of an inverter according to a variety of exemplary embodiments of the present disclosure may set an optimized capacity to the inverter DC input terminal capacitor by optimizing the over-temperature protection for the capacitor by the current totalization, thereby increasing the power density of the inverter and improving the cost competitiveness of the inverter.

Although the exemplary embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. An over-temperature protection system for a direct current (DC) capacitor of an inverter, comprising:
the capacitor configured to generate a DC voltage on both terminals thereof;
the inverter configured to convert the DC voltage generated on the both terminals of the capacitor into an alternating current (AC) voltage and supply the AC voltage to a motor; and
a controller configured to induce a ripple current of the capacitor based on a driving point determined by a torque and a speed of rotation of the motor and determine whether the capacitor is in an over-temperature state based on a totalized value of the ripple current,
wherein the controller is configured to determine the driving point based on a torque command of the motor and the rotation speed of the motor calculated by using a rotor position detection sensor configured to detect a specific position of a rotor of the motor.

2. The over-temperature protection system of claim 1, wherein the controller includes a ripple current data map in which the driving point-specific ripple current is stored.

3. The over-temperature protection system of claim 2, wherein the ripple current data map is generated by:
applying a modulation index and a power factor, predetermined according to the driving point, to the ripple coefficient expressed by following formula:

$$\sqrt{MI\left\{\frac{\sqrt{3}}{2\pi} + \cos^2\phi\left(\frac{2\sqrt{3}}{\pi} - \frac{9}{8}MI\right)\right\}},$$

wherein the MI is the modulation index, and the Ø is the power factor; and
multiplying a value to which the modulation index and the power factor are applied with the three-phase current of the motor predetermined according to the driving point.

4. The over-temperature protection system of claim 1, wherein the controller includes a ripple coefficient data map in which a driving point-specific ripple coefficient is stored, and is configured to induce the ripple current by multiplying a three-phase current, supplied to the motor by the inverter, with the ripple coefficient.

5. The over-temperature protection system of claim 4, wherein the ripple coefficient data map is generated by applying a modulation index and a power factor, predetermined according to the driving point, to the ripple coefficient expressed by following formula:

$$\sqrt{MI\left\{\frac{\sqrt{3}}{2\pi} + \cos^2\phi\left(\frac{2\sqrt{3}}{\pi} - \frac{9}{8}MI\right)\right\}},$$

wherein the MI is the modulation index, and the Ø is the power factor.

6. The over-temperature protection system of claim 1, wherein the controller is configured to calculate the totalized value of the ripple current by adding an excessive portion when a magnitude of the ripple current is greater than a magnitude of a continuous current and subtracting an insufficient portion when the magnitude of the ripple current is less than the magnitude of the continuous current.

7. The over-temperature protection system of claim 6, wherein, when the totalized value reaches a predetermined over-temperature determination reference, the controller is configured to determine that the capacitor is in the over-temperature state and reduce the torque of the motor.

8. The over-temperature protection system of claim 1, wherein, when the totalized value reaches a predetermined over-temperature determination reference, the controller is configured to determine that the capacitor is in the over-temperature state and reduce the torque of the motor.

9. An over-temperature protection method for a direct current (DC) capacitor of an inverter, the method being applicable to a motor driving system including the capacitor configured to generate a DC voltage on both terminals thereof and the inverter configured to convert the DC voltage generated on the both terminals of the capacitor into an alternating current (AC) voltage and supply the AC voltage to a motor, the method comprising:
collecting, by a controller, a torque and a speed of rotation of the motor;
inducing, by the controller, a ripple current of the capacitor that corresponds to the torque and the speed of rotation of the motor collected based on a ripple current data map or a ripple coefficient data map previously stored, using a driving point-specific ripple current or a driving point-specific ripple coefficient determined by the torque and the speed of rotation of the motor; and
totalizing, by the controller, the induced ripple current, and when a value of the totalized ripple current reaches a predetermined over-temperature determination reference, determining that the capacitor is in an over-temperature state and reducing the torque of the motor,
wherein the collecting of the torque and the speed of rotation of the motor calculates the rotation speed of the motor based on using a rotor position detection sensor configured to detect a specific position of a rotor of the motor, and
wherein the inducing of the ripple current determines a driving point based on a torque command of the motor and the rotation speed of the motor.

10. The over-temperature protection method of claim 9, wherein the inducing of the ripple current includes:
inducing, by the controller, a ripple coefficient of the capacitor that corresponds to the torque and the speed of rotation of the motor collected based on the ripple coefficient data map in which the driving point-specific ripple coefficient is stored; and
inducing, by the controller, the ripple current by multiplying a three-phase current, provided to the motor by the inverter, with the induced ripple coefficient.

11. The over-temperature protection method of claim 9, wherein the ripple current data map is generated by:
applying, by the controller, a modulation index and a power factor, predetermined according to the driving point, to the ripple coefficient expressed by following formula:

$$\sqrt{MI\left\{\frac{\sqrt{3}}{2\pi} + \cos^2\phi\left(\frac{2\sqrt{3}}{\pi} - \frac{9}{8}MI\right)\right\}},$$

wherein the MI is the modulation index, and the Ø is the power factor; and
multiplying, by the controller, a value to which the modulation index and the power factor are applied with the three-phase current of the motor predetermined according to the driving point.

12. The over-temperature protection method of claim 9, wherein the ripple coefficient data map is generated by applying a modulation index and a power factor, predetermined according to the driving point, to the ripple coefficient expressed by following formula:

$$\sqrt{MI\left\{\frac{\sqrt{3}}{2\pi} + \cos^2\phi\left(\frac{2\sqrt{3}}{\pi} - \frac{9}{8}MI\right)\right\}},$$

wherein the MI is the modulation index, and the Ø is the power factor.

13. The over-temperature protection method of claim 9, wherein, in the reducing of the torque, the totalized value of the ripple current is calculated by adding an excessive portion when a magnitude of the ripple current is greater than a magnitude of a continuous current and subtracting an insufficient portion when the magnitude of the ripple current is less than the magnitude of the continuous current.

* * * * *